United States Patent [19]
Eberhart

[11] 3,776,316
[45] Dec. 4, 1973

[54] ELECTRONIC CONTROL FOR CROP THINNING

[75] Inventor: Russell C. Eberhart, Manhattan, Kans.

[73] Assignee: Allied Farm Equipment, Inc., Chicago, Ill.

[22] Filed: Jan. 5, 1972

[21] Appl. No.: 215,554

[52] U.S. Cl. .................................................. 172/6
[51] Int. Cl. ........................................... A01b 63/00
[58] Field of Search ...................... 172/6, 5; 47/1.43

[56] References Cited
UNITED STATES PATENTS

| | | | |
|---|---|---|---|
| 3,543,860 | 12/1970 | Field et al. | 172/6 |
| 3,439,746 | 4/1969 | Lee | 172/6 |
| 3,525,403 | 8/1970 | Cayton et al. | 172/6 X |
| 3,609,913 | 10/1971 | Rose | 172/6 X |
| 3,512,587 | 5/1970 | Shader | 172/6 X |
| 3,590,925 | 7/1971 | Troutner et al. | 172/6 |

*Primary Examiner*—Stephen C. Pellegrino
*Attorney*—Roy H. Olson et al.

[57] ABSTRACT

An electronic control for a crop thinning machine comprises a control unit with a plant sensor input and control circuitry providing an output for operating a solenoid that controls the position (i.e. hoeing or non-hoeing) of the hoeing implement. The control circuitry is of solid state components and includes a series of interacting timing circuits for programming the operation of the hoeing implement in a predetermined manner. Independent plant sensing and timing circuitry are provided for each of a plurality of rows being thinned. In one mode of operation the machine is hoeing until a plant is sensed. The plant is left in place after which hoeing takes place unconditionally for a preset distance. The hoeing continues until the next plant is sensed, which is left in place, and the cycle is repeated. In another mode of operation the hoeing implement is in its non-hoeing position. The first plant sensed is left in place following which hoeing takes place unconditionally over a preset distance after which the hoeing implement is moved back to its non-hoeing position until the next plant is sensed. The cycle then repeats. A simple mode-selection switch is employed for quickly changing modes during field operation.

11 Claims, 9 Drawing Figures

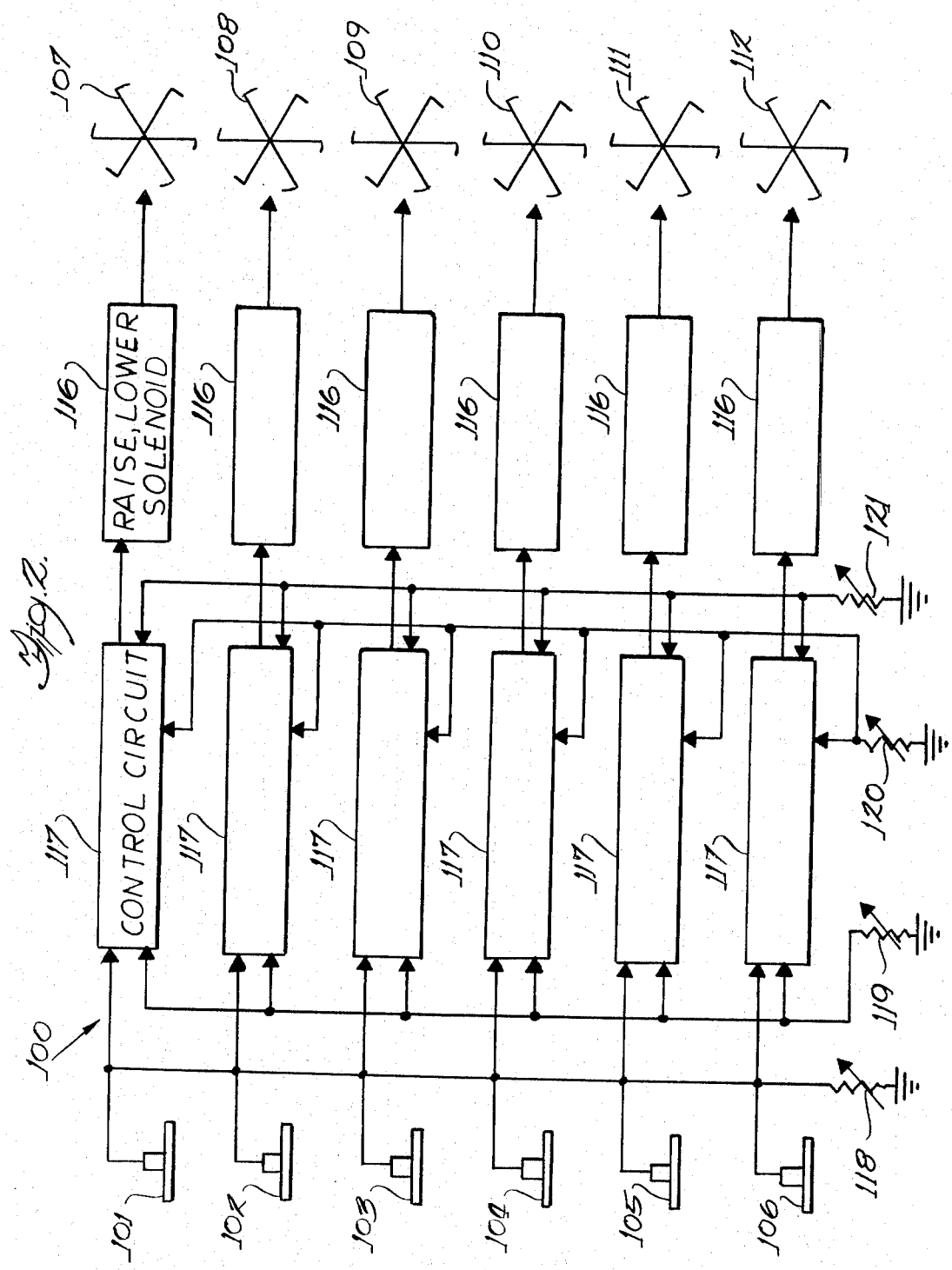

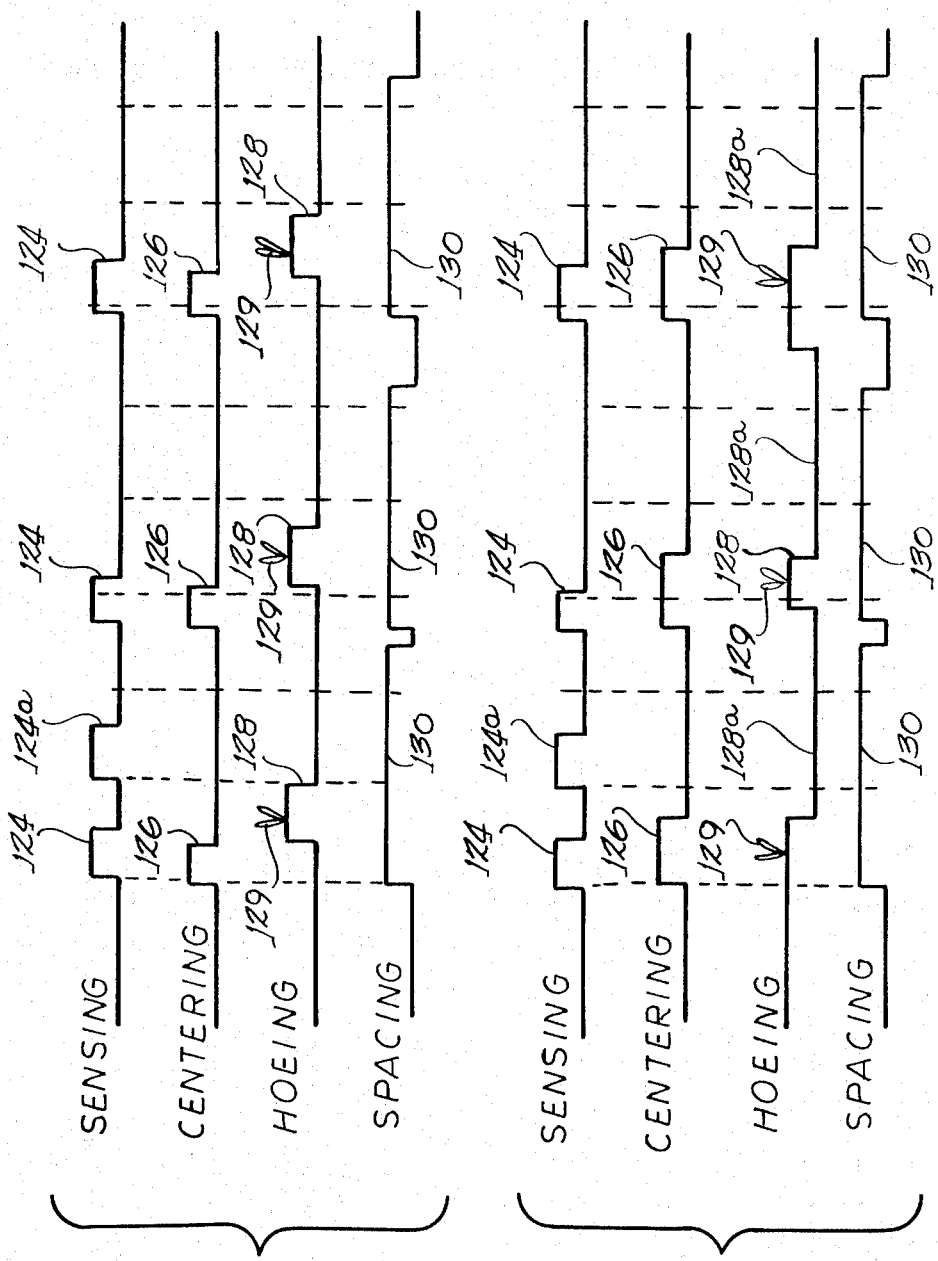

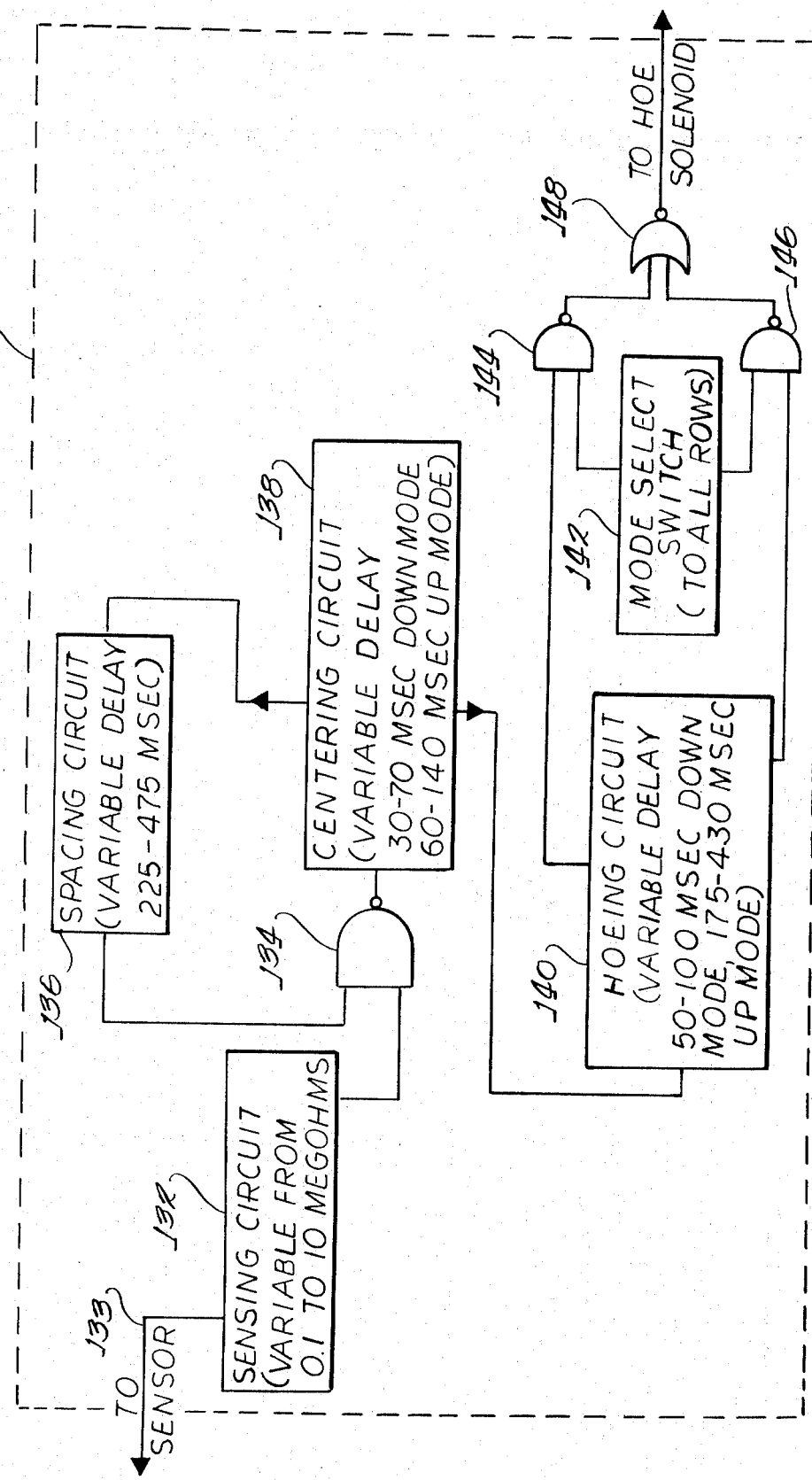

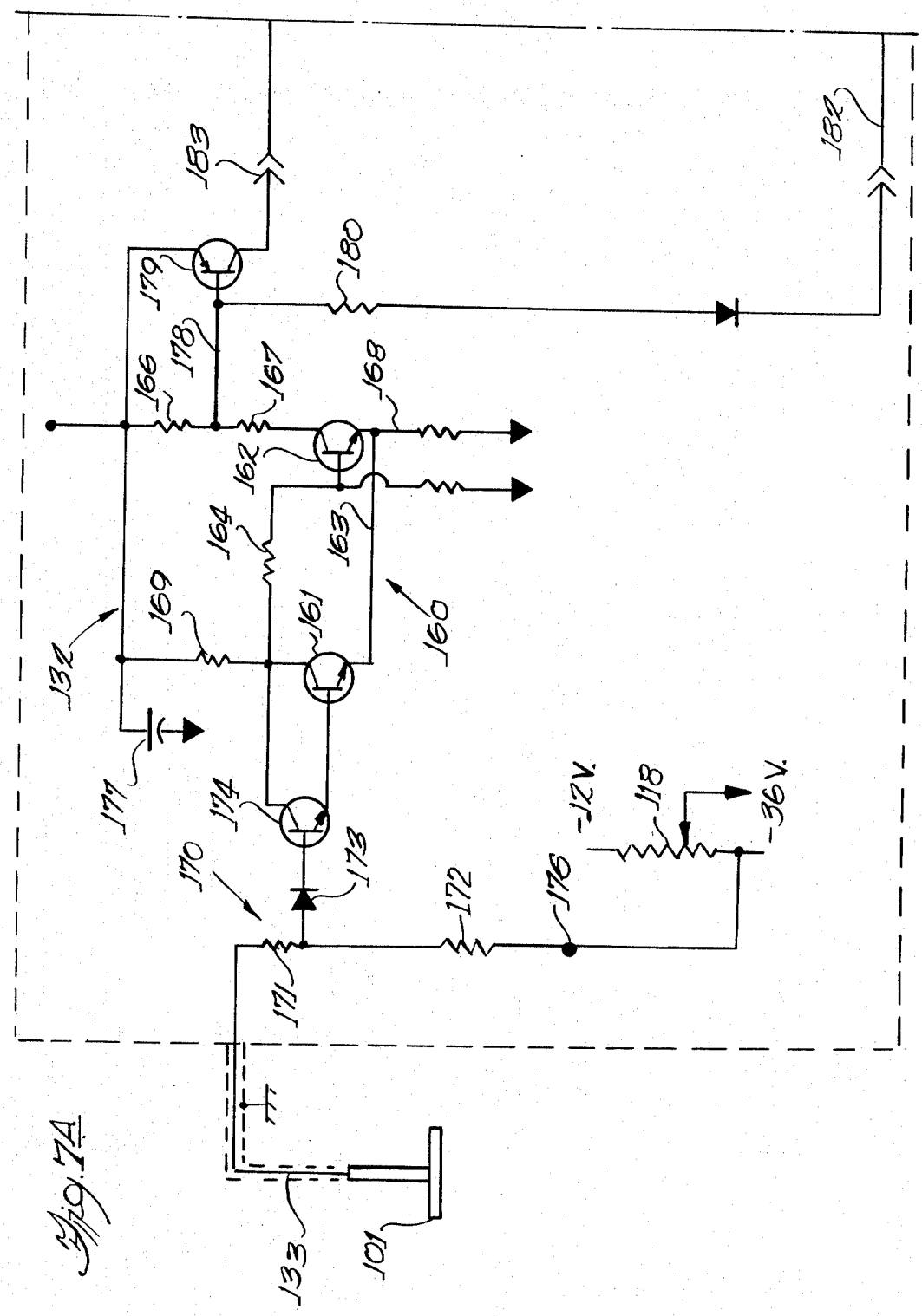

ELECTRONIC CONTROL FOR CROP THINNING

BACKGROUND OF THE INVENTION

This invention relates to improvements in control systems for crop thinning machines, particularly machines for thinning row crops such as lettuce, tomatoes, sugar beets, etc.

It is well recognized that crop thinning of various row crops should be performed in order to obtain a maximum yield. For this purpose, crop thinning machines have been used in order to carry out this task economically. These machines generally include some type of control system for programming the operation of the hoeing knives in a predetermined manner.

In one type of machine the user selects for operation a hoeing knife having a length corresponding to a minimum desired spacing between plants. A sensor is used to detect the plants. When a plant is sensed, the knife, on command from the control system, is driven into the ground just ahead of the plant that was sensed. The first plant sensed is saved following which hoeing takes place over a predetermined distance after which the knife is raised until the next plant is sensed. While this mode of operation is preferred for many purposes, the arrangement has the disadvantage in that there is no continuous cultivation or weeding except over the predetermined distance during which the hoeing knife is down.

In another type of machine the mode of operation is the reverse of that described in the previous paragraph. Thus, when a plant is sensed that plant is saved and the hoeing takes place at least over a preset distance. The hoeing thereafter continues until the next plant is sensed, this next plant being saved, and the cycle then repeating. Weeding or cultivation between plants takes place. Such a machine, therefore, cannot be used in those situations wherein the mode described in the previous paragraph is desired.

Each of the two modes of operation have advantages and disadvantages. In the second-mentioned or "down" mode, weeding or cultivation between plants takes place. This is generally desired but is usually achieved, as a practical matter, when the plants are large and the soil is not too hard. In first-mentioned or "up" mode, plants that are not sensed are saved. This can result from the plant being too small to be sensed by the sensor, as may be determined by the sensitivity of the sensor. Lack of sensing can also occur due to ground roughness which could prevent the sensor from touching the plant. Consequently, small plants and rough ground are suitable for the up mode since otherwise (i.e. in the down mode) large distances will be undesirably hoed out due to failure to sense a plant and thus raise the hoeing knives.

OBJECTS OF THE INVENTION

An object of this invention is to provide a control unit for a crop thinning machine which permits operation of the machine selectively in either of the two modes previously described. A mode selection switch is provided so that the mode can be changed at any time, even while the apparatus is motion.

A further object of this invention is to provide a control unit in which solid state electronic components are used. These solid state components are connected to provide adjustable interacting timing circuits for programming the operation of the hoe-control solenoid for each row. Thus the present invention eliminates programming discs, relays, etc., which are inherently less reliable in field operation than solid state components.

Another object of this invention is to provide a control unit of the type and for the purpose stated in which the timing circuits operate independently of the speed of the machine along the rows being hoed. Viewed another way, the internal timing circuits provide a measure of ground distance travelled. This eliminates the need for ground wheels and other distance measuring hardware purporting to synchronize or program the control unit as a function of the distance travelled by the machine. While theoretically ground wheels would seem desireable, slippage due to wet or loose soil makes them less than ideal. Furthermore, it has been found that operators of thinning systems (eg., a tractor drawn machine) choose their ground speeds, and then convert that speed to r.p. m., which is maintained by observation of a tachometer and generally varies not more than about 5 percent. This has been found to be sufficiently close to the desired constant speed that internally controlled timing circuits can be relied upon exclusively to program the operation of the hoeing knives.

BRIEF DESCRIPTION OF THE DRAWINGS

FIG. 2 is a simplified block diagram of a control circuit used in the crop thinning control system of this invention;

FIG. 3 is a chart illustrating the operation of the control circuit of FIGS. 1 and 2 during the down mode of op-eration when the hoeing knives are in a normally down position;

FIG. 4 is a chart illustrating the operation of the circuit of FIGS. 1 and 2 during the upper mode of operation when the hoeing knives are in a normally up position;

FIG. 5 is a more detailed block diagram of a single one of the control circuits shown in FIG. 2 and is typical for all such control circuits of the control system;

FIGS. 7A, 7B and 7C constitute a detailed schematic diagram of the system showing the electrical connections and com-ponents used therein.

DETAILED DESCRIPTION

Figure 1:
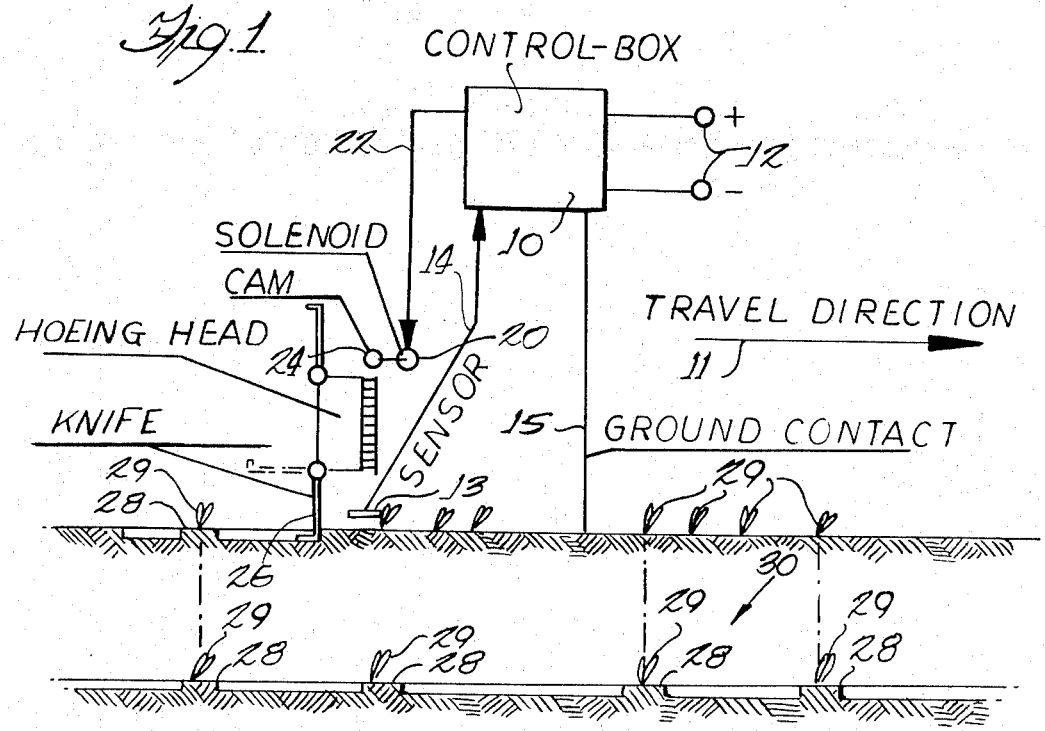
FIG. 1 is a simplified schematic diagram of a system which utilizes the novel concepts of this invention to control the position of hoeing knives.

FIG. 1 illustrates a schematic diagram of a plant cultivating arrangement in accordance with this invention and includes a control box 10 which receives operating power from a vehicle battery at the input terminal 12. The vehicle may be a tractor or the like which transports the machine in the direction of arrow 11 over a plurality of rows of plants such as sugar beets. A resistance-type sensing device 13 is positioned near the ground and over the row of plants to sense the presence of each plant and apply a signal through a sensing line 14 to the input of the control box 10. An electrical ground reference member is shown at 15. This may be a conventional soil contact spring (not shown) on the machine. Accordingly, a signal resulting from detection of a plant will then activate control circuitry within the control box to control a solenoid device 20 via an output line 22. The solenoid device operates a cam arrangement 24 which controls raising and lowering of the hoeing knives 26 in a known manner.

A mound or block of dirt 28 is formed around the plant 29 and the amount of dirt in front of the plant is substantially the same as the amount of dirt behind the plant, this being accomplished by a centering control circuit within the control box 10. The lower row of plants is designated by reference numeral 30 and indicates a fully cultivated row with undesired plants which were too closely spaced having been removed. The sensor 13 senses each of the plants in the row being cultivated but circuit means are provided within the control box 10 to disable the sensor for a predetermined period of time so that a minimum predetermined spacing will be achieved between plants.

Referring to FIG. 2, the basic block diagram of the crop thinning control system of this invention is designated generally by reference numeral 100, and is mounted within the control box 10 of FIG. 1. The control system 100 is here illustrated as including six crop sensors 101, 102, 103, 104, 105 and 106 which are transported over a corresponding number of rows of plants to be thinned. The sensors 101–106 correspond to the sensor 13 of FIG. 1 and are maintained a predetermined distance above the ground by a suitable depth wheel (not shown) on the machine. The sensors may be of the type which have a plurality of discrete elemental areas to sense the size of the plant to be cultivated while smaller plants, such as weeds will not produce a sensing signal. In this regard it should be noted that the sensing is effected by sensing the resistance of the plant to ground reference 15. A sensitivity adjustment or selector, hereinafter described, may be manually set by the user to determine the minimum size of plant that will activate the control circuitry, it being understood that the smaller the plant the greater its resistivity.

The removal of the weeds and undesired plants is accomplished by a corresponding number of hoe cutters or knives 107, 108, 109, 110, 111 and 112 which lags behind the sensor a given distance, this being in the order of between 10 and 100 centimeters, depending on the type of plant being cultivated and the speed of transport of the system over the ground. The hoe knives 107–112 may be of the rotating type as shown or of another configuration as desired. The hoe cutters 107-112 are raised and lowered in accordance with a preselected program so that upon sensing a desired plant 29, of FIG. 1, the cutters are raised over the plant to prevent damaging the same. After a predetermined time interval, which corresponds to a given distance of ground travel, the cutter is lowered to continue thinning of the weeds and undesired plants. Thus a mound of dirt 28 is formed about the plant. The raising and lowering of the cutters is accomplished by a raise and lower circuit 116 which controls the solenoid 20 of FIG. 1 to raise the cutter above the plant. Lowering of the cutters may be accomplished by gravity or spring means as desired. The raise and lower circuit 116 receives control signals from a control circuit 117 which will provide the proper centering of the plant 29 within the dirt mount 28. Each of the cutters 107-112 operates independently of the other so that the plants in each of the rows need not be in exact transverse alignment with one another.

During the description of the control circuits only a single control circuit 117 and raise and lower circuit 116 will be illustrated in detail, it being understood that all other control circuits and raise and lower solenoid-actuating circuits are similar.

While discrete control circuits utilized for each system corresponding to a row, it is preferred that common control means be provided so that the user thereof can set the desired functions of all the control circuits in a single operation. For example, a variable resistance element 118 may have a common connection to the input of all of the control circuits 117 and with a single adjustment the threshold or sensitivity level of the sensors 101–106 is set. Similarly, a variable resistance element 119 is connected to the control circuits 117 and is used to set the time duration of a flip-flop circuit which, in turn, controls the centering of the up position of the hoeing knives 107–112. That is, the hoeing knives are energized to a raised, non-thinning position a given distance before the plant to be cultivated and lowered behind the plant at substantially the same distance. Therefore, the centering control 119 controls the time duration or position of the cutting blades before and after their raising so that the amount of untouched or unthinned dirt of each side of the cultivated plant is the same.

To insure proper plant spacing, a variable resistance element 120 is connected in common with all of the control circuits 117 and is used to set the length of time that the hoeing knives 107–112 are in the down position. Therefore, if plants to be cultivated are planted too close to one another a minimum space between plants will be maintained automatically by the spacing adjustment 120. Finally, a variable resistance element 121 is used to adjust the length of time that the hoeing blades 107–112 are in their up position, this time being independent of the time duration of the sensing pulse received by the sensors 101–106.

Each of the control circuits 117 shown in FIG. 2 includes mode reversing switch means which allow the same circuit arrangement to be used in a down mode of operation, with the hoeing knives 107–112 continuously thinning and being raised only upon sensing a plant to be cultivated, or an up mode of operation, with the hoeing knives 107–112 continuously raised and lowered only for thinning after sensing a plant to be cultivated.

For a better understanding of the operating functions of the control circuit of FIG. 2, reference is now made to FIGS. 3 and 4 which illustrate the two modes of operation. In FIG. 3 a plurality of pulses 124 represent the pulse produced in a sensing circuit in response to any one of the sensors 101–106, this pulse corresponding to a minimum size of the plant to be cultivated. This spacing of the pulses 124 corresponds to the spacing between plants. Should a plant be sensed at a spacing closer to a previously sensed plant than is desired, as indicated by the pulse 124a, this pulse will have no affect on the circuit and the corresponding one of the hoeing knives will remain down to cut the plant. Therefore, plants which are spaced a predetermined minimum distance from one another will be untouched by the hoeing knives while plants which are too closely spaced will be cut down. For each of the pulses 124, a centering pulse 126 will be produced in the control circuit 117. This centering pulse has an adjustable time duration so that the up time of the hoeing knives can be set and will be equally spaced in front of and in back of the plant to be cultivated. Since the sensing units 101-106 are spaced from the hoeing knives 107-112, respectively, a desired time delay between the sensing pulse 124 and a hoeing pulse 128 is desired. This time delay is adjustable and corresponds to, among other things, the ground speed of the system of FIG. 1 which is transported by a tractor, or the like. In the form of the invention herein described, the hoeing knives 107-112 are in a down cutting position when the raise and lower solenoid circuits 116 are basically de-energized, and an energizing pulse indicated by reference numeral 128 will cause the hoeing knives to be raised only for the time duration of this pulse. Finally, a spacing pulse 130 is developed within the control circuits 117. The spacing pulse has its initial start up at the beginning of the sensing pulse 124 but which is thereafter independent of the sensing pulse and will provide the minimum distance between plants as mentioned above. The down mode of operation shown in FIG. 3 has the cutting knives 107-112 in a down position and raises the cutting knives as indicated by the pulses 128 to prevent the knives from cutting down a desired plant, which is indicated graphically by reference numeral 129.

On the other hand, the up mode of operation as indicated in FIG. 4 will have the hoeing knives 107-112 in an up position during normal operation and upon sensing a plant, as indicated by the pulses 124, a predetermined time interval will pass before the hoeing knives are lowered as indicated by the negative portion 128a. After a predetermined time interval, the hoeing knives again raise as indicated by the pulse 128 of FIG. 4 and the knives will remain in this up position until shortly after a subsequent plant is sensed. It will be noted that the sensing pulses 124, centering pulses 126, and spacing pulses 130 are similar in both FIGS. 3 and 4, the major difference being the mode of operation indicated by the hoeing pulses 128.

Referring now to FIG. 5, a more detailed block diagram of one of the control circuits 117 is shown. The control circuit 117 includes a sensing circuit 132 for receiving pulses from its associated sensor via a coaxial cable 133 and includes a threshold circuit adjustment for setting the level of the input pulse that will actuate the circuit. Preferably, the sensing circuit 132 includes a Schmitt trigger arrangement and produces a constant voltage output so long as the threshold value at the input thereof is exceeded. The output of the sensing circuit 132 is applied to an AND logic circuit 134 which, in turn, has a second input thereof connected to a spacing circuit 136. When both the spacing circuit and the sensing circuit provide inputs to the AND logic 134, an inverted pulse will be delivered to a centering circuit 138, which, in turn, produces the centering pulses 126 of FIGS. 3 and 4. The output of the centering circuit 138 is then delivered to a hoeing circuit 140 which, in turn, controls the energization of a solenoid or other control mechanism to raise and lower the hoeing knives 107-112. The hoeing solenoid is controlled in response to a mode selector switch 142 and a plurality of AND logic circuits 144, 146, and an OR logic circuit 148. The mode switch 142 and logic circuits 144, 146 and 148 may be common to all of the control circuits 117 but for purposes of illustration it is shown as included within a given control circuit in FIG. 5. The spacing circuit 136, centering circuit 138, and hoeing circuit 140 are of similar circuit construction and include monostable multivibrator circuits which are reset by adjustable timing circuits so that the time duration of the pulses produced within the circuit can be changed. The pulses of FIGS. 3 and 4 correspond to the output signals developed within the corresponding circuits of FIG. 5.

Figure 6:
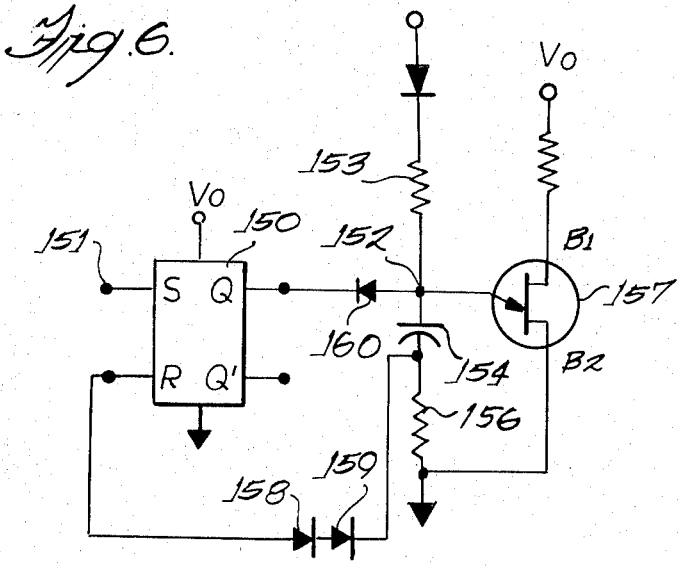
FIG. 6 is a detailed schematic diagram of a timing circuit used in conjunction with a flip-flop to provide the variable timing settings for the functions as set forth in the charts of FIGS. 3 and 4.

For a better understanding of each of the circuits within the spacing circuit 136, centering circuit 138, and hoeing circuit 140, reference is now made to FIG. 6 which illustrates in detail a typical circuit, the only difference being the values of the timing capacitor or timing resistors or both. Here a basic flip-flop circuit is designated by reference numeral 150 and may be of any conventional arrangement, the one shown here being of the R-S input type. An input pulse at terminal 151 will change the state of the flip-flop 150 and also remove ground potential from circuit point 152 at the juncture of a timing resistor 153 and a capacitor 154. At this time capacitor 154 begins to charge through resistor 153 and a second resistor 156 and when the breakdown voltage emitter-base junction of a unijunction transistor 157 is reached the capacitor is rapidly discharged. This rapid discharge of capacitor 154 will produce a reset pulse which is delivered through a pair of back to back diodes 158 and 159 to the reset input of flip-flop 150. This reset pulse will produce the timing function necessary for operation of the control system.

The diodes 158 and 159, because of their natural barrier voltage, provide a small amount of pulse amplitude regulation so that extraneous signals will not reset the flip-flop circuit 150. For example, when silicon diodes are used each has a 0.7 volt drop across its junction, and with two diodes connected as shown the reset voltage pulse must exceed 1.4 volts to provide a reset signal to the flip-flop 150. Furthermore, an isolating diode 160 is connected between the output of the flip-flop 150 and the circuit point 152 so that capacitor 154 will not charge as the result of current flow from the flip-flop 150. 160 also helping to reset the flip-flop 150.

Figure 7B:
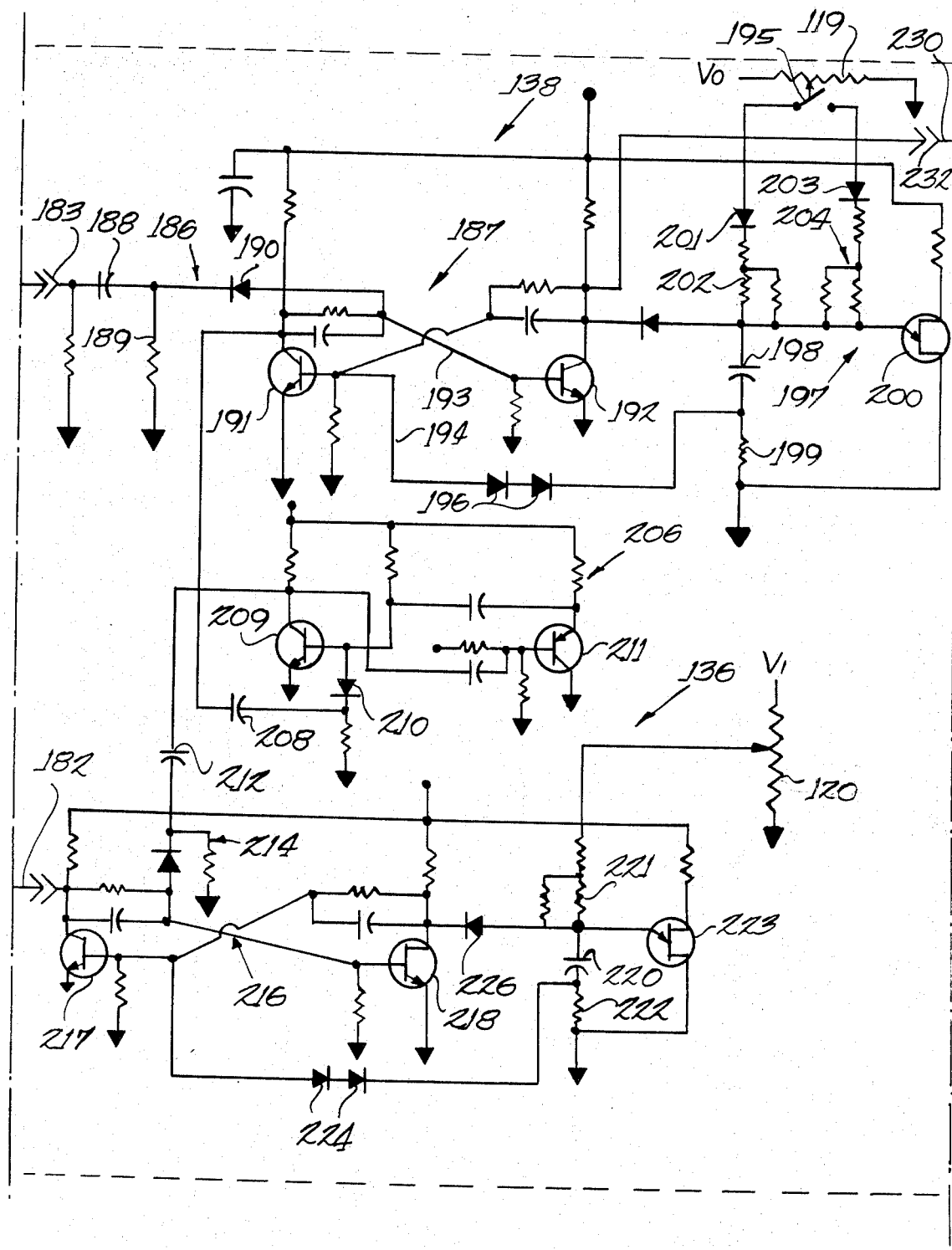
Figure 7C:
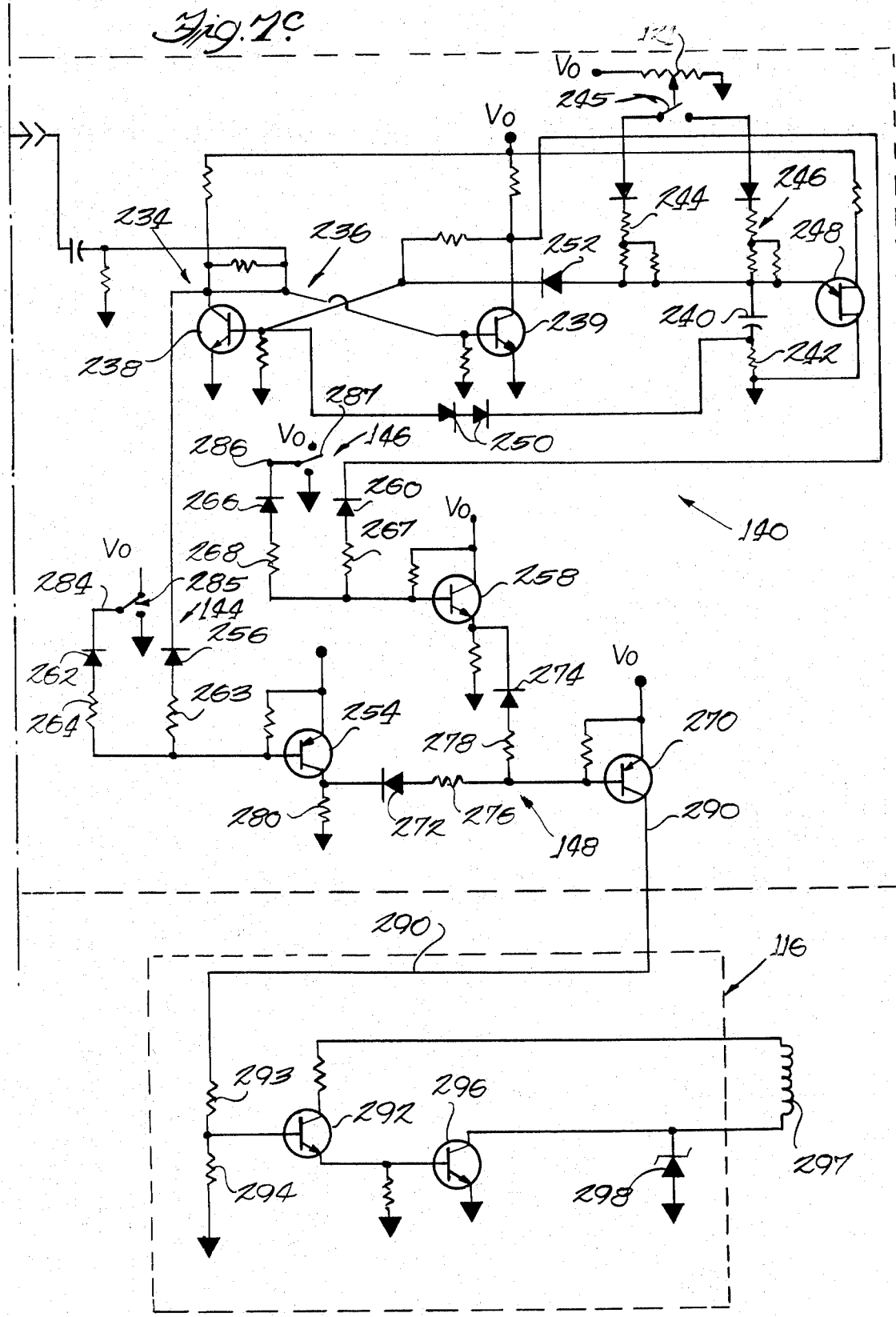

The detailed circuit is shown in FIG. 7 and is divided up into FIGS. 7A, 7B and 7C. FIG. 7A illustrates the sensing circuit 132. FIG. 7B illustrates the spacing and the centering circuits 136 and 138, respectively. FIG. 7C illustrates the hoeing circuit 140 with associated AND logic circuits 144, 146 and OR logic circuit 148, and also illustrates the power control circuit for the solenoid which controls up and down movement of the hoeing knives.

Referring first to FIG. 7A the sensing circuit 132 includes a Schmitt trigger circuit 160 which is formed of a pair of transistors 161 and 162. Transistors 161 and 162 are tied together at their emitter electrodes via a line 163 and the collector of transistor 161 is connected to the base of transistor 162 via a resistor 164. A current path through transistor 162 is through a series network comprising resistors 166, 167 in the collector circuit thereof and a resistor 168 in the emitter circuit. The current path for transistor 161 is through a resistor 169, and the quiescent state of the Schmitt trigger is such that transistor 161 is non-conductive while transistor 162 is conductive. To render transistor 161 conductive, a threshold circuit arrangement designated generally by reference numeral 170 includes a pair of resistors 171 and 172 having their juncture tied to the anode of a diode 173 which, in turn, has its cathode connected to the base electrode of a preamplifier transistor 174. The sensor element 101 is connected to the resistor 171 while a variable negative voltage from the sensing adjustment potentiometer 118 is connected to terminal 176 and to the sensing circuit ground reference point for setting the threshold level at which transistor 174 will be rendered conductive. The threshold level, as mentioned above, is determinative of the size of the plant being sensed which changes the resistance value at the input of transistor 174. A filter capacitor 177 of relatively large value is connnected to the voltage supply line to prevent extraneous pulse signals from affecting operation of the sensing circuit.

Upon sensing a plant of the desired minimum size, the threshold circuit will produce an input signal to transistor 161 which, in turn, will render transistor 162 non-conductive to produce a positive pulse at the output line 178. This will render the AND gate transistor 179 non-conductive and a negative pulse will be applied to the input circuit of the centering circuit 138 which is shown in FIG. 7B. Also connected to the base electrode of transistor 179 is an AND gate circuit formed by a clamping circuit which consists of a resistor 180 and a diode 181 which, in turn, are connected to the spacing circuit 136. Thus, the AND gate or clamping circuit, when rendered operative by the spacing circuit 136, eliminates output signals from the sensing circuit 132 so that the sensing of plants for a predetermined period of time will have no further affect on this circuit.

The coupling between the clamping circuit formed by resistor 180 and diode 181 and the spacing circuit 136 is made through a line 182 and the output of transistor 179 is applied to the centering circuit 138 via a line 183.

Immediately upon sensing the first desired plant to be cultivated, the output signal from transistor 179 is delivered to an input circuit 186 of a flip-flop circuit 187. The input circuit 186 comprises a coupling capacitor 188, a voltage developing resistor 189 and a diode 190. The flip-flop circuit 187 corresponds substantially to that of the flip-flop circuit 150 of FIG. 6, and the input circuit 186 corresponds to the S input 151. The flip-flop circuit 187 includes a pair of cross coupled transistors 191 and 192 having their collector electrodes cross coupled through resistance capacitance networks to the base electrode of the other transistor in a well known manner. In this instance, transistor 191 is non-conductive and transistor 192 is conductive and the input circuit 187 is coupled to the base electrode of transistor 192 via a lead 193. The reset input is the base electrode of transistor 191 and includes a lead 194 which is connected to a pair of series diodes 196 which, in turn, are connected to the timing timing circuit 197. Once the flip-flop circuit 187 is rendered operative i.e. its state changed, a reset pulse is automatically generated by the timing circuit 197. For example, a capacitor 198 connected in series with a resistor 199 is charged to a predetermined voltage value sufficient to cause breakover of a uni-junction transistor 200. The rate of charge on capacitor 198 is determined by the charge path to which it is connected, this being switchably changed by switch 195 connected to the potentiometer 119 to correspond to the two modes of operation, i.e., the down mode or the up mode. For example, one charge path includes a diode 201 and a resistor network 202 to provide one charge rate for capacitor 198 and another charge path includes a diode 203 and a resistance network 204 to provide a second charge rate for capacitor 198. This can be seen in FIG. 3 wherein the centering pulse signal 126 for the down mode is shorter than the centering signal 126 of FIG. 4 which is for the up mode of operation. The output pulse produced by firing of uni-junction transistor 200 is then delivered to the base electrode of transistor 191 to reset the circuit.

When the state of the flip-flop circuit 187 changes, an output signal is delivered to a monostable circuit 206 which forms part of the spacing circuit 136. The input signal to monostable circuit 206 is coupled through a capacitor 208 to the base electrode of a transistor 209, this coupling being through a blocking diode 210. Initially transistor 209 is conductive and the input signal through diode 210 will render it non-conductive which, in turn, will render its associated transistor 211 conductive. After a predetermined fixed time interval, transistor 211 becomes non-conductive to again apply operating bias to transistor 209. The monostable circuit 206 developes a trigger pulse at the output thereof to be coupled through a capacitor 212 which is connected to the input circuit 214 of a flip-flop circuit 216 which forms part of the spacing circuit 136. The flip-flop circuit 216 is of the same basic configuration as that of flip-flop 187 and includes a pair of transistors 217 and 218 which are cross coupled via resistance capacitance network. Transistor 217 is non-conductive and transistor 218 conductive when the flip-flop 216 is in the quiescent state. The signal at the input circuit 214 will render transistor 217 conductive and transistor 218 non-conductive. During this state of the flip-flop 216 a timing capacitor 220 begins charging through its series resistance network 221 and a resistor 222 until such time as the breakover voltage of uni-junction transistor 223 is reached. During this time the AND gate formed by diode 181 is grounded through transistor 217 and all subsequent pulses produced by the sensor 101 are prevented from reaching the base electrode of transistor 179 of the AND gate. The time duration of the charge on capacitor 220 corresponds to the spacing desired between plants, this spacing being a minimum as shown by the pulse signals 130 of FIGS. 3 and 4. The flip-flop circuit 216 is returned to its quiescent state via the output signal developed from uni-junction transistor 223 which is delivered to the reset input via a pair of series diodes 224 connected to the base electrode of transistor 217. A diode 226 connected to the collector electrode of transistor 218 and serves as a blocking diode between transistor 218 and capacitor 220. After the timing capacitor 220 has reset the flip-flop circuit 216 to its original condition, sensing signals will again be delivered through transistor 179 of FIG. 7A.

Also, because of the relatively long duty cycle of flip-flop circuit 216, in the order of 90 percent, it is desirable that an input pulse of sufficient time duration be utilized to insure that the flip-flop 216 will again be turned on for spacing the next desired plant even after a very short reset time. Therefore, the time duration of the trigger pulse produced by the monostable circuit 206 is greater than the reset time of the flip-flop 216.

The output of the centering circuit 138 is delivered via a line 230 and a coupling member 232 to the input circuit 234 of a flip-flop 236 which is shown in FIG. 7C. The flip-flop circuit 236 is substantially of the same construction as the flip-flop 187 shown in FIG. 7B.

Flip-flop circuit 236 is comprised of a pair of transistors 238 and 239 which have their base and collector electrodes cross coupled through resistor-capacitor networks in a well known manner. Here also a timing capacitor 240 is connected in series with a resistor 242 and receives a charging current through either one of a pair of resistance networks 244 or 246 which are switched into the circuit by switch 245. Switch 195 and 245 correspond to the mode select switch 145 of FIG. 5. Upon reaching a given voltage charge on capacitor 240 a uni-junction transistor 248 is rendered conductive to produce a reset pulse through a pair of series connected diodes 250 connected to the base electrodes of transistor 238 and through a single diode 252 connected to the collector electrode of transistor 239. This action will revert the state of the flip-flop circuit 236 back to its original condition, i.e. transistor 238 non-conductive and transistor 239 conductive. The output of transistor 238 is applied to the base electrode of transistor 254 through a diode 256 while the output of transistor 239 is connected to the base electrode of a transistor 258 through a diode 260. Diode 256 together with a diode 262 form the AND logic circuit 144. These diodes have their anodes connected together via series resistors 263 and 264, respectively, and both cathodes must go positive to render transistor 254 non-conductive. Similarly, diode 260 together with diode 266 form the AND logic circuit 146 and their anodes are connected together via resistors 267 and 268, respectively. Transistors 254 and 258 function as the OR logic circuit 148 and either transistor must be rendered non-conductive before an output transistor 270 can be rendered conductive to control energization of the hoe solenoid to raise or lower the hoe. The base electrode of transistor 270 is connected to the emitter electrodes of transistors 254 and 258 via diodes 272 and 274 connected in series with resistors 276 and 278, respectively. With both of the transistors 254 or 258 in the conductive state, a positive voltage is sensed at the base electrode of transistor 270 which is sufficient to eliminate the bias potential across the base emitter junction and transistor 270 is maintained non-conductive. On the other hand, when either transistors 254 and 258 are rendered non-conductive, a current path to ground is provided through the associated resistor 280 or 282 in the collector electrodes of transistors 254 and 258, respectively, and this will provide a bias current in the base emitter junction of transistor 270 to render it conductive.

Transistor 254 is rendered conductive when a low or ground potential is applied to the base electrode thereof via either of the diodes 256 or 262. That is, when either terminal 284 or transistor 238 becomes negative, transistor 254 will have a negative bias at its base electrode and become conductive. Similarly, if terminal 286 of diode 266 is made negative by activation of the mode switch 287 then transistor 258 is rendered conductive to apply positive voltage to the base electrode of transistor 270.

By connecting terminals 284 and 286 to mode switches 285 and 287, which may correspond to the mode selector switch 142 of FIG. 5, the up mode and down mode of operation of the circuit can be selected. The timing of the flip-flop circuit 236 is thus utilized either to effect a predetermined hoeing distance after sensing a plant, i.e. the up mode, or is utilized to determine a predetermined distance before and after sensing a plant and continuous hoeing is maintained, i.e., the down mode. With the selector switch in a down mode of operation the output signal from transistor 270 will correspond to that of the pulse 128 of FIG. 3, and when in the up mode it will correspond to the pulse 128a as shown in FIG. 4.

An output signal from transistor 270 is delivered over a line 290 which is connected to the input of a transistor 292, FIG. 7C. This input signal is developed across a pair of series resistors 293 and 294. Transistor 292 is a preamplifier which then turns on a power transistor 296 to apply operating current through a solenoid coil 297, which corresponds to the solenoid 20 of FIG. 1, and the raising and lowering of the hoeing knives is thus accomplished. Preferably, a zener diode 298 is connected in parallel with transistor 296 and serves as transient suppression means when current through the solenoid 297 is abruptly terminated. Zener diode 298 is selected to improve the response time of operation of the solenoid coil 297 when energized and de-energized. Energization of the hoe solenoid 297 corresponds to the pulse signals 128 of FIGS. 3 and 4 and thus raises the cutting knives from the hoeing position, and upon de-energization of the hoe solenoid 297 the cutting knives will again be lowered into a cutting position.

In the down mode of operation, and as shown in FIG. 3, transistor 270 is to be non-conductive in the quiescent state. This is accomplished by the mode selector switch 142 of FIG. 5 which causes switch 285 to be grounded and switch 287 to receive a plus potential. Since the stable state of the flip-flop circuit 236 is such that transistor 238 is off and transistor 239 is on, the second input of the AND gate 146, i.e. diode 260, is grounded, while the second input to AND gate 144, i.e. diode 256, is at a plus potential both AND gates are disabled. A pulse applied to the input circuit 234 of the flip-flop 236 will change the state of transistors 238 and 239 thereby applying positive potential to both diodes 260 and 266 of the AND gate 146 and ground a potential to both diodes 256 and 262 of the AND gate 144. This action will render transistor 254 conductive which, in turn, renders transistor 270 conductive to produce the up pulse as indicated by reference numeral 128 of FIG. 3. During this mode of operation transistor 258 remains non-conductive.

On the other hand, in the up mode of operation, as shown in FIG. 4, mode selector switch 142 is actuated so that switch 285 applies positive potential to diode 262 and switch 287 applies ground potential to diode 266. Since the quiescent state of flip-flop circuit 236 is such that diode 256 also is positive, i.e. transistor 238 off, the AND gate function of the diodes 256 and 264 is accomplished and transistor 254 is continuously non-conductive. Similarly, diodes 260 and 266 are both grounded and transistor 258 is continuously conductive. Therefore, the AND gate function is continuous and the output of transistor 270 will energize the solenoid circuit 116 of FIG. 7C, so that the hoeing knives are up until after a plant is sensed. Upon sensing the presence of a plant to be cultivated, a predetermined time interval lapses and after the plant is passed then the state of transistors 254 and 258 changes to cut off transistor 270 and drop the hoeing knives into a hoeing position, this being represented by reference numeral 128a following the pulses 128.

Among the components described, the following values or types were found suitable for a prototype of the invention for use with a known type of crop thinning machine. Variations may be necessary, depending upon overall design parameters.

| | |
|---|---|
| Transistors 161, 162, 174 | 2N4124 |
| Resistance 164 | 390k ohms |
| Resistance 166 | 10k ohms |
| Resistance 167 | 33.2k ohms |
| Resistances 168, 189 | 10k ohms |
| Resistance 169 | 46.4k ohms |
| Resistance 171 | 681k ohms |
| Resistance 172 | 2.21m ohms |
| Diode 173 | 1N4002 |
| Capacitor 177 | 10 mfd. |
| Transistors 179, 254, 258, 270 | 2N4125 |
| Resistance 180 | 39k ohms |
| Diodes 181, 190, 201, 203, 210, 226, 252, 254, 256, 260, 262, 266, 272, 274 | 1N4154 |
| Capacitor 188 | 56 pfd. |
| Transistors 191, 192, 209, 211, 217, 218, 238, 239 | 2N4123 |
| Diodes 196, 224, 250 | 1N4156 |
| Capacitor 198 | 0.33 mfd. |
| Resistance 199 | 24 ohms |
| Transistors 200, 223, 248 | 2N4870 |
| Potentiometers 119, 120 | 500 ohms |
| Capacitors 208, 212 | 56 pfd. |
| Capacitor 220 | 1 mfd. |
| Resistance 242 | 20 ohms |
| Capacitor 240 | 0.50 mfd. |
| Resistances 263, 264, 267, 268 | 39k ohms |
| Resistances 272, 276 | 18k ohms |
| Resistances 280, 282 | 15k ohms |
| Transistor 292 | 2N4922 |
| Resistance 293 | 27k ohms |
| Resistance 294 | 22k ohms |
| Transistor 296 | 2N4914 |
| Zener diode 298 | 1N5364 |

The invention is claimed as follows:

1. In an apparatus for thinning a row of plants while moving along such row, comprising hoeing means on the apparatus having a raised position that leaves the ground unhoed and a lowered position wherein the ground is hoed, actuating means for effecting movement of said hoeing means from one position to the other position, control means for operating said actuating means, said control means comprising sensing means for sensing the presence of a plant plus additional means including a plurality of inter-acting timing circuits operable independently of the speed of movement of the apparatus along the row and responsive to the sensing of said plant for disabling the sensing means and causing said actuating means to:
 1. be in a condition such that the hoeing means is in its raised position for a predetermined interval of time after sensing of said plant,
 2. then be in a condition such that the hoeing means is in its lowered position thereby to leave the sensed plant in place,
 3. then maintain the hoeing means in its lowered position for at least a predetermined interval of time, and then,
 4. re-enable the sensing means, said additional means further including mode-control means connected to one of said timing circuits for selectively:
  a. maintaining the hoeing means in its lowered position after said last-mentioned interval of time until a second plant is sensed, or
  b. raising the hoeing means after said last-mentioned interval of time;
said mode-control means including a selector switch.

2. In an apparatus according to claim 1, said timing circuits including at least one monostable multivibrator.

3. In an apparatus according to claim 2, said monostable multivibrator comprising a flip-flop that triggers a timer circuit, the output of said timer circuit resetting the flip-flop after a predetermined delay.

4. In an apparatus according to claim 1, said timing circuitry being entirely of solid state electronic components.

5. A unit for controlling the position of a hoeing implement of a plant thinning machine wherein the hoeing implement is movable to and from a hoeing position and a non-hoeing position to a thin row of plants, said unit comprising hoeing-implement actuating means, and circuit means for operating said actuating means, said circuit means including a sensing circuit for sensing the presence of a plant, a spacing circuit for setting a minimum predetermined distance over which the ground will be hoed to remove any plants within said predetermined distance, a centering circuit for centering unhoed plants in blocks of ground of the row, means connecting said centering circuit to said sensing circuit, means connecting said centering circuit to said spacing circuit, a hoeing circuit responsive to an output of the centering circuit, and mode-selecting circuit means cooperating with the output of the hoeing circuit to provide an output for connection to said actuating means for selectively driving said actuating means in either of two modes, one mode being such as to maintain the hoeing implement in hoeing position after said predetermined distance and then moves to its non-hoeing position upon thereafter sensing of the next plant, the other mode being such that the hoeing implement moves to its non-hoeing position after said predetermined distance and then moves to its hoeing position upon thereafter sensing of a plant.

6. A control unit according to claim 5 in which the spacing circuit, the centering circuit, and the hoeing circuit each includes adjustable timing circuits that provide signal outputs for preselected time intervals.

7. A unit for controlling the position of a hoeing implement of a plant thinning machine wherein the hoeing implement is movable to and from a hoeing position and a non-hoeing position to thin a row of plants, said unit comprising hoeing-implement actuating means, and circuit means for operating said actuating means, said circuit means including a sensing circuit for sensing the presence of a plant, a spacing circuit for setting a minimum predetermined distance over which the ground will be hoed to remove any plants within said predetermined distance, a centering circuit for centering unhoed plants in blocks of ground of the row, means connecting said centering circuit to said sensing circuit, means connecting said centering circuit to said spacing circuit, and a hoeing circuit responsive to an output of the centering circuit, the output of said hoeing circuit driving said actuating means, said spacing circuit, centering circuit and hoeing circuit each including an adjustable timer circuit comprised of a monostable multivibrator.

8. A unit according to claim 7 including an additional monostable multivibrator having an output for triggering said monostable multivibrator of the spacing circuit.

9. A unit according to claim 8 in which said centering circuit also has an output connected to said additional monostable multivibrator, said means connecting said centering circuit to said sensing circuit comprising an AND gate and with the output of said AND gate being connected as an input to said centering circuit.

10. A unit according to claim 7 in which said circuit means further includes mode-selecting means controlling the output of said hoeing circuit for selective operation in either of two modes, in one mode the implement being maintained in its hoeing position after said predetermined distance and until a plant is thereafter sensed, and in the other mode the hoeing implement being moved to its non-hoeing position and maintained thereat until a plant is sensed.

11. A unit according to claim 10 in which said hoeing circuit has outputs cooperating with said mode-selecting means and with logic circuits for providing a signal to effect operation of said actuating means.

* * * * *

UNITED STATES PATENT OFFICE
CERTIFICATE OF CORRECTION

Patent No. 3,776,316　　　　　　　　Dated December 4, 1973

Inventor(s) Russell C. Eberhart

It is certified that error appears in the above-identified patent and that said Letters Patent are hereby corrected as shown below:

Col. 4, line 6, after "circuits" insert --are--

Col. 6, line 22, change "breakdown" to --breakover--

Col. 6, line 41, after "150" cancel -- 160 also helping to reset the flip-flop 150. --

Col. 8, line 56, change "90%" to --99%--

Col. 12, line 11, change "to a thin row of plants" to --to thin a row of plants--

Signed and sealed this 25th day of June 1974.

(SEAL)
Attest:

EDWARD M. FLETCHER, JR.　　　　　C. MARSHALL DANN
Attesting Officer　　　　　　　　Commissioner of Patents